UNITED STATES PATENT OFFICE.

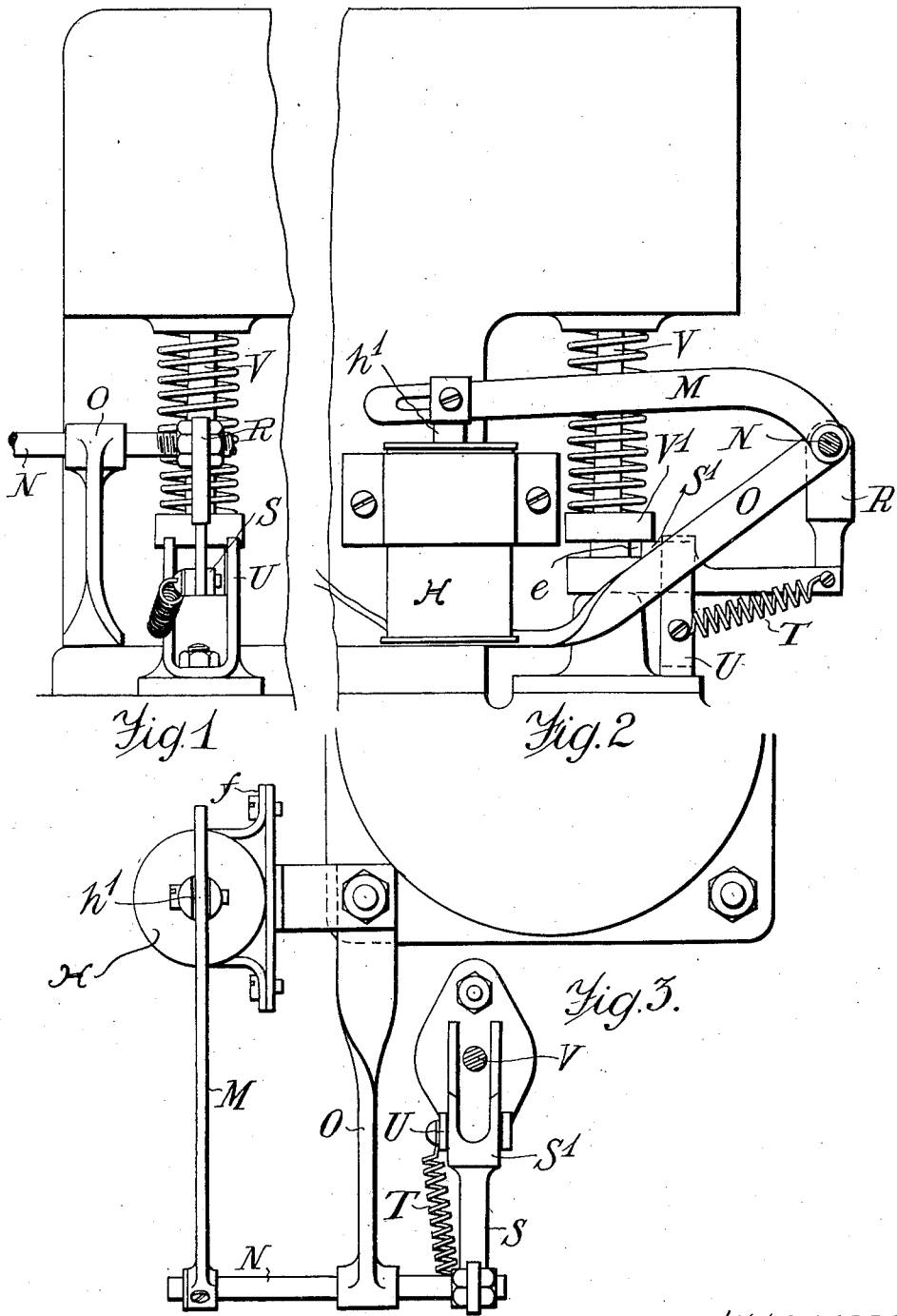

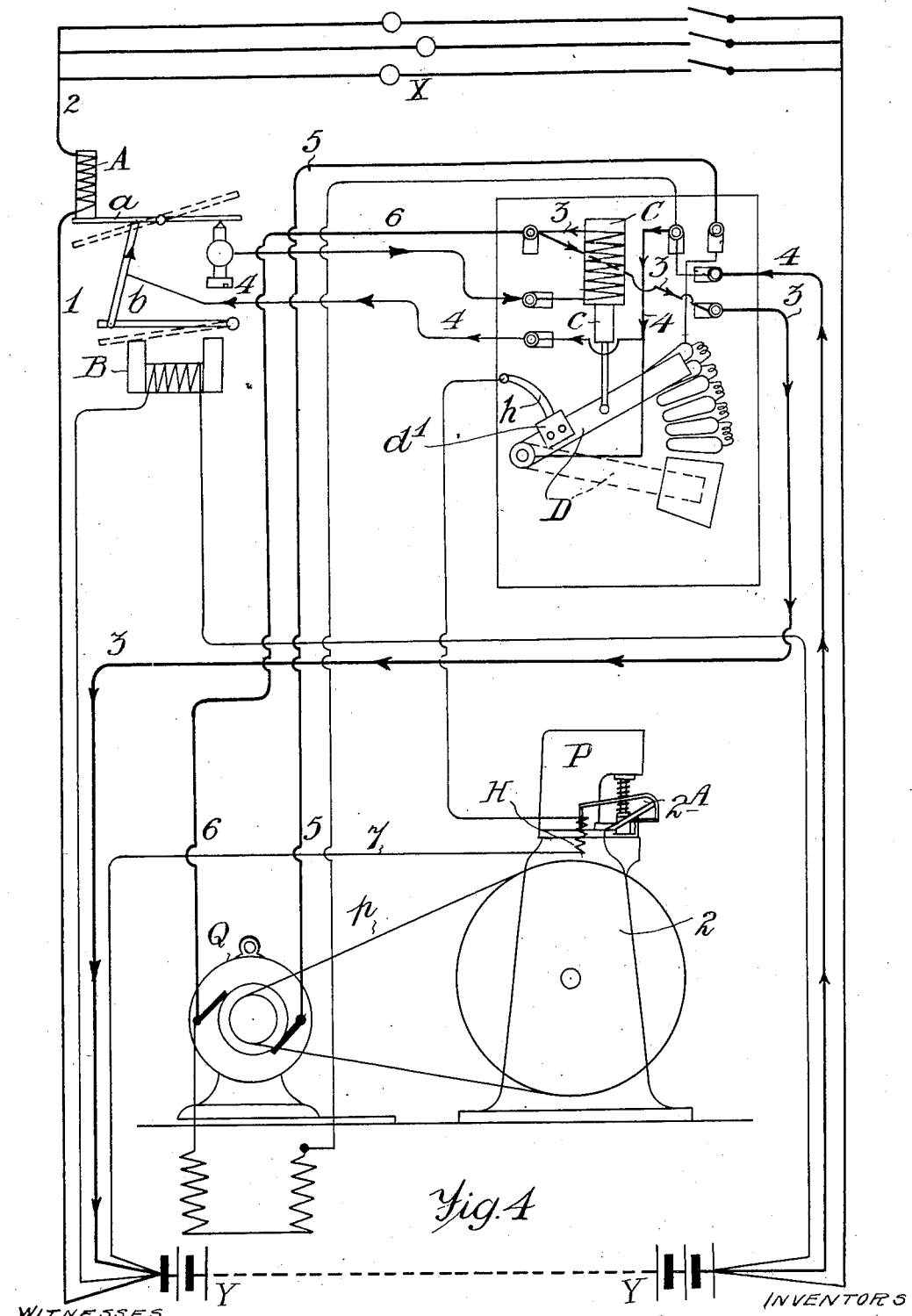

LEO SUNDERLAND AND GILBERT CECIL PILLINGER, OF WESTMINSTER, LONDON, ENGLAND.

ELECTRIC AND AUTOMATIC CONTROL OF ENGINES, DYNAMOS, AND BATTERIES.

1,054,368.  Specification of Letters Patent.  Patented Feb. 25, 1913.

Application filed November 17, 1910. Serial No. 592,915.

*To all whom it may concern:*

Be it known that we, LEO SUNDERLAND and GILBERT CECIL PILLINGER, subjects of the King of Great Britain and Ireland, and residents of Westminster, county of London, England, have invented certain new and useful Improvements in the Electric and Automatic Control of Engines, Dynamos, and Batteries, of which the following is a specification.

Our invention relates to automatic electric generating systems of the kind in which a prime mover drives a dynamo which supplies current to a battery which is in parallel with the lamps or other consumption circuit, the prime mover being started and stopped automatically by electrical devices operated by the battery according to the requirements of the system and the drain upon its supply of current.

Our invention is especially useful when used with that variety of the above described type in which the prime mover is an internal combustion engine or any other kind requiring a certain impetus to start it and in which the battery is employed, when the drain upon the system reaches a certain point, to drive the dynamo as a motor to give an initial impetus to the prime mover.

The main object of our invention is to produce a system in which:—firstly, the battery is reduced to the smallest dimensions possible; and secondly, its voltage is kept at a nearly constant maximum. The advantages of such a system over those heretofore existing being in the first place a reduction in the cost and weight of the battery and secondly an increase in efficiency because as the current from the dynamo is supplied (in a sense) direct to the lamps or other cause of consumption, the battery as far as possible merely performs starting functions.

Other objects and advantages of the invention will be apparent from the following detailed description when taken in connection with the accompanying drawings.

The accompanying drawings illustrate the manner in which our invention is carried into effect.

Figure 1 is a diagrammatic view of the invention, including the various connections. Fig. 2 is an end elevation. Fig. 3 a side elevation. Fig. 4 a plan view of an exhaust valve lifter appertaining to an internal combustion engine in connection with the arrangement.

Referring to Fig. 4, we will first describe the differential relay. The coil A is in series with the lamp circuit X. The coil B is in shunt across the battery Y and as elsewhere in this diagram relay circuit wiring is shown in thin lines. The coil A is provided with an armature $a$ pivoted at its center, and the coil B with an armature $b$ pivoted at one end and the two armatures are connected by a link. When the coil A is the stronger the armatures assume the position shown in full lines,—when the coil B is the stronger they assume the position shown in dotted lines. When less than the predetermined small proportion of lamps is switched on, the current is obtained from the battery from the leads 1 and 2, but the series coil A is not sufficiently energized to overcome the pull of the coil B, and the armatures retain the position shown in dotted lines. In the case of more than this small proportion of lamps being switched on the coil A is sufficiently energized to pull the armatures into the position shown in full lines. The armatures, or one of them, are connected so as to form part of the relay circuit of the coil C which is energized from the battery by the leads 3 and 4 and when the armatures are in the position shown in full lines the relay circuit is closed and the coil C lifts its core $c$ and raises the contact lever D against the action of a spring or gravity from the position (off) indicated in dotted outline, to the position shown across the rheostat contacts which closes the circuit of the dynamo Q through the leads 5, the contacts and the rheostat lever D, the lead 4, the battery Y and the leads 3 and 6 thus causing the dynamo Q to rotate as a motor and imparting the necessary initial movement to the prime mover P by means of the belt $p$ as shown. At the same time a contact piece $d'$ on the rheostat lever D comes into contact with a contact piece $h$ and completes the relay circuit of the solenoid H which controls the valve of the prime mover P. When the prime mover is an internal combustion engine as indicated we may make use of a part of our invention to be hereinafter described. When the engine is thus automatically started and its speed is sufficient to rotate the dynamo as generator and thus overcome the E. M. F. of the battery any charging of the battery which may be necessary proceeds, the dynamo simultaneously taking up the load of the extra lamps switched on, and the working of any other current consuming device connected to the system. When the lamp circuit is switched off the coil B causes the relay circuit of the coil C to be opened, cutting the motor off from the battery and opening the relay circuit of the valve coil to stop the engine. Should less than the predetermined small portion of lamps be switched into the circuit and allowed to burn indefinitely the coil A will not be sufficiently energized and they will in that case derive their current from the battery whose E. M. F. will fall until the pull of the shunt coil will be reduced below that of the series coil and the engine will be started. It is clear that the coils and battery must be so proportioned that the shunt coil armature is released before the E. M. F. of the battery falls so low as to be too weak to actuate the dynamo as a motor.

Referring to Figs. 1, 2 and 3, a method of operating the valve mechanism of the prime mover is illustrated which is applicable to internal combustion motors. The object of this part of the invention is to insure that the engine should automatically complete its cycle as a driving motor when receiving its initial rotation and by the same means immediately to prevent the engine from drawing a charge into the cylinder when the automatic apparatus is operated to cut off the engine. The solenoid H (also shown in Fig. 4) has a core $h'$ which is jointed to a lever M mounted fast on a spindle N supported by a bearing bracket O. The opposite end of the spindle carries a crank R which is pivoted to a bar S. This bar S is pulled to the left in Fig. 2 by a spring T and passes between guides U and is forked to embrace without touching the exhaust valve spindle V at the lower end of the latter in order not to interfere with its guiding. The bar S is provided with a raised portion S' which is adapted to pass beneath a collar V' fast on the valve spindle and hold the valve up from closing, when the solenoid H is not in operation and the bar S is pulled by the spring T. When the relay circuit of the solenoid H is closed the bar and the raised portion S' are withdrawn and the valve is permitted to close, enabling the engine to compress its charge. So long as the exhaust valve is open the engine can neither draw nor compress a charge and is out of operation.

It is obvious that the solenoid H may be used to operate any other suitable valve device.

The circuit is indicated by arrowheads in Fig. 4 of the drawings, and by reference thereto it will be observed that said circuit starts from battery Y and follows lead 4 to armatures $b$ and $a$, thence follows lead 3 through coil C to battery Y.

Having now described our invention, what we claim as new and desire to secure by Letters Patent of the United States is:—

1. In an apparatus of the class described, the combination with a prime mover, of means including a battery for automatically starting the same directly a small proportion of the load is exceeded or a diminution occurs in the electro-motive force of said battery.

2. In an automatic electric generating system, the combination with a prime mover, of a battery, a lighting circuit, a coil in series with said circuit, a switch circuit, an armature operated by said coil to close the switch circuit to start said prime mover immediately a small proportion of the load is exceeded in the lighting circuit, and a coil in shunt across the battery tending directly or indirectly to oppose the movement of the armature by the series coil proportioned and adapted to yield to the series coil if the electro-motive force of the battery is substantially diminished.

3. In an automatic electric generating system, the combination with a prime mover provided with a controlling valve, of a dynamo, a battery adapted to operate the dynamo as a motor, a lighting circuit, a coil in series therewith, a motor-starting relay-circuit, an armature operated by the coil to close the said circuit when a proportion of the load is exceeded in the lighting circuit, a coil in shunt across the battery tending to oppose the movement of the said armature and adapted to yield to the series coil if the electro-motive force of the battery is diminished, and a motor-starting switch adapted to throw current from the battery into the dynamo to drive it as a motor and to operate said valve to allow the engine to obtain power.

4. In an automatic electric generating system, the combination with an internal combustion engine, of a dynamo adapted to operate as a motor to initially operate said engine, a battery for operating the dynamo, a lighting circuit, a coil, a motor starting relay circuit, an armature operated by the coil to close the motor starting relay circuit when a small proportion of the load is exceeded in the lighting circuit, a coil in shunt across the battery to oppose the movement of the armature by the series coil and adapted to yield to the series coil if the electro-motive force of the battery is diminished, a motor-starting switch adapted to throw current from the battery into the dynamo to drive the same as a motor, and means operated by the motor-starting switch to relieve the compression in the cylinder of the engine when the motor-starting switch is off and to withdraw such relief when the switch is on.

5. In an electric generating system of the kind described, the combination with a prime mover, of automatic means including a battery for starting the prime mover when a small proportion of the load is exceeded and if the E. M. F. of the battery is reduced substantially as and for the purposes specified.

6. In an electric generating system of the kind described the combination with an internal combustion engine, of a battery, a relay coil, operated when a small proportion of the load is exceeded and if the E. M. F. of the battery is reduced, to relieve the compression in the engine cylinder.

In testimony whereof we affix our signatures in the presence of two witnesses.

LEO SUNDERLAND.
GILBERT CECIL PILLINGER.

Witnesses:
 ROBERT HUNTER,
 E. C. AXE.